(12) United States Patent
Wang

(10) Patent No.: US 9,240,907 B2
(45) Date of Patent: Jan. 19, 2016

(54) TRANSCODING SCHEME TECHNIQUES

(71) Applicant: Broadcom Corporation, Irvine, CA (US)

(72) Inventor: Zhongfeng Wang, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 329 days.

(21) Appl. No.: 13/751,407

(22) Filed: Jan. 28, 2013

(65) Prior Publication Data

US 2013/0208771 A1    Aug. 15, 2013

Related U.S. Application Data

(60) Provisional application No. 61/599,130, filed on Feb. 15, 2012, provisional application No. 61/599,126, filed on Feb. 15, 2012.

(51) Int. Cl.
*H04L 25/02* (2006.01)
*H04L 1/00* (2006.01)
*H04L 25/49* (2006.01)

(52) U.S. Cl.
CPC ............. *H04L 25/02* (2013.01); *H04L 1/0057* (2013.01); *H04L 25/4904* (2013.01); *H04L 25/4908* (2013.01)

(58) Field of Classification Search
None
See application file for complete search history.

(56) References Cited

U.S. PATENT DOCUMENTS

2007/0157060 A1* 7/2007 Ganga et al. ................. 714/752
2010/0293441 A1* 11/2010 Booth ........................... 714/776

OTHER PUBLICATIONS

Teshima et al ("Bit-Error-Tolerant (512*N)B/(513*N+1)B Code for 40 Gb/s and 100 Gb/s Ethernet Transport", , IEEE Infocom Workshops 2008).*

* cited by examiner

*Primary Examiner* — Leon-Viet Nguyen
(74) *Attorney, Agent, or Firm* — Oblon, McClelland, Maier & Neustadt, L.L.P.

(57) ABSTRACT

Disclosed herein are certain embodiments of a coding system and method that guarantee a pair of sync bits in a transcoded block will appear on the same physical lane. Embodiments may then use this property for data synchronization and to guarantee a bit transition in a certain amount of time on a physical lane. Embodiments of a coding system and process for configuring alignment marker blocks are also disclosed.

20 Claims, 10 Drawing Sheets

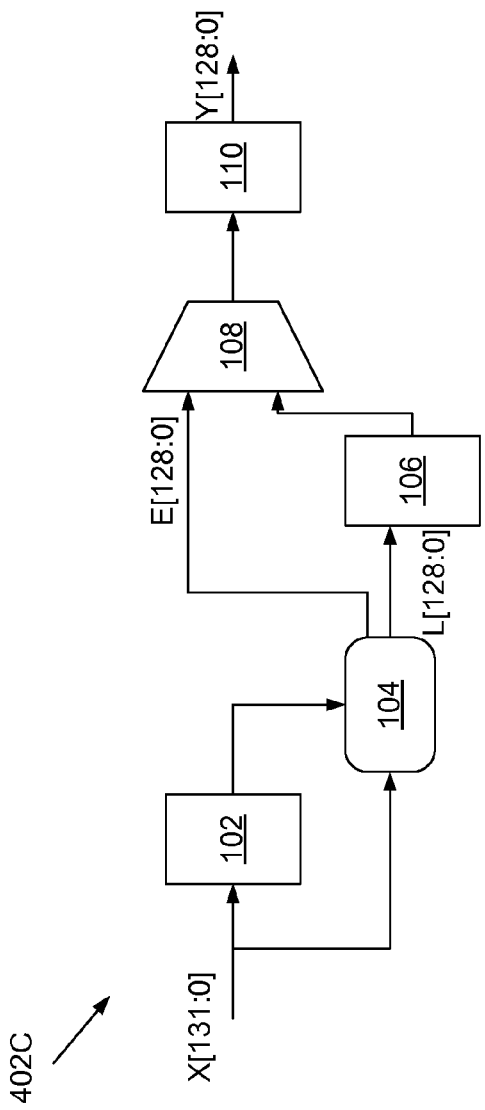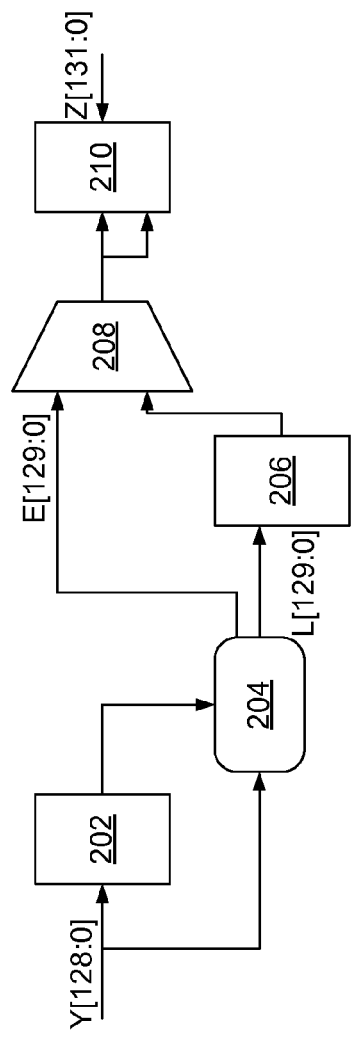
FIG. 1
FIG. 2

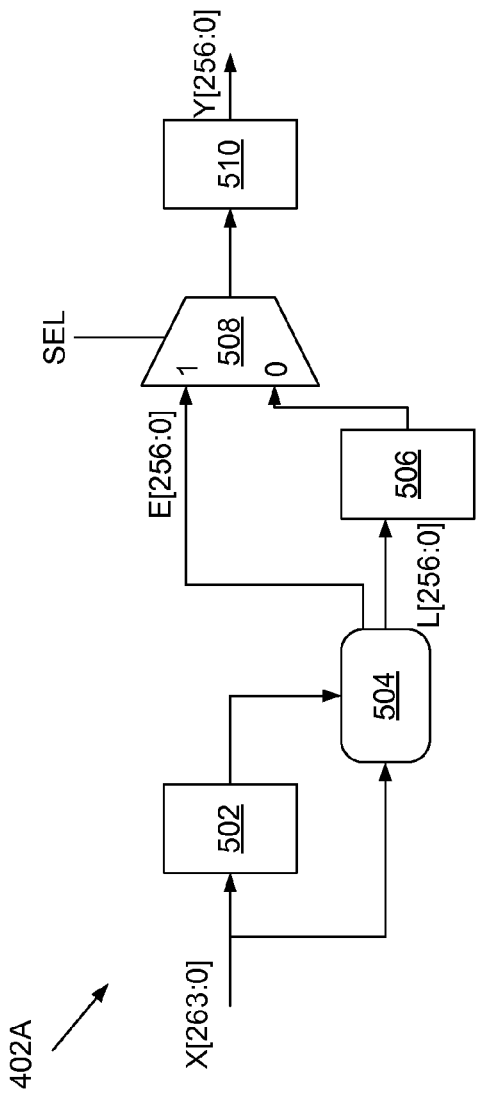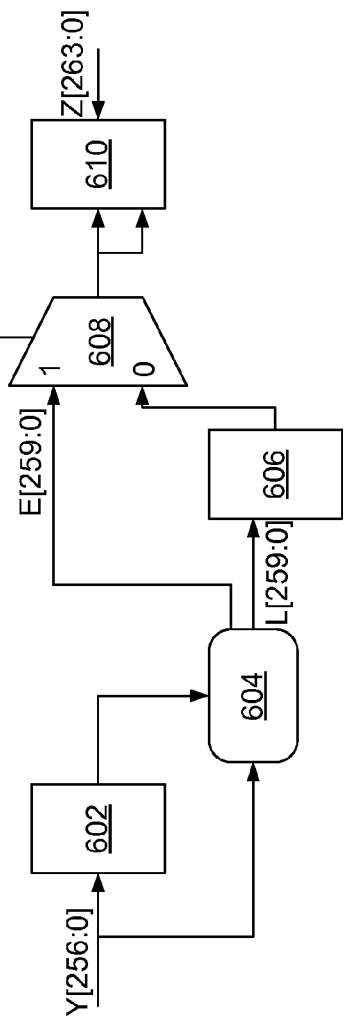
FIG. 5
FIG. 6

US 9,240,907 B2

TRANSCODING SCHEME TECHNIQUES

CROSS-REFERENCE TO RELATED APPLICATIONS

This application claims priority to and the benefit of copending U.S. provisional applications entitled, "Allocating Sync Bits for Multiple Transcoding Schemes," having Ser. No. 61/599,130, filed Feb. 15, 2012, and "Handling Alignment Markers with Transcoding," having Ser. No. 61/599, 126, filed Feb. 15, 2012, all of which are entirely incorporated herein by reference.

BACKGROUND

Users of computer networks today have witnessed an incredible increase in performance capabilities, including speed and integrity of data transfers. Ethernet comprises one type of computer network that offers many varieties in terms of capabilities, including high speed networks such as 40 Gigabit Ethernet (e.g., 40GbE) and 100 Gigabit Ethernet (e.g., 100GbE), among others. Such Ethernet networks support sending Ethernet frames at 40 and 100 gigabits per second over multiple 10 Gbit/s or 25 Gbit/s lanes. The 40/100 Gigabit Ethernet standards include a number of different Ethernet physical layer (PHY) specifications. With rapid growth of server, network, and internet traffic, higher data rates over backplanes and high density, low cost twinaxial copper cables are needed.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1 is a block diagram of an example embodiment of a transcoder module according to 256B/258B transcoding.

FIG. 2 is a block diagram of an example embodiment of a reverse transcoder module according to 256B/258B transcoding.

FIG. 5 is a block diagram of an example embodiment of a transcoder module according to 512B/514B transcoding.

FIG. 6 is a block diagram of an example embodiment of a reverse transcoder module according to 512B/514B reverse transcoding.

DETAILED DESCRIPTION

Figure 3:
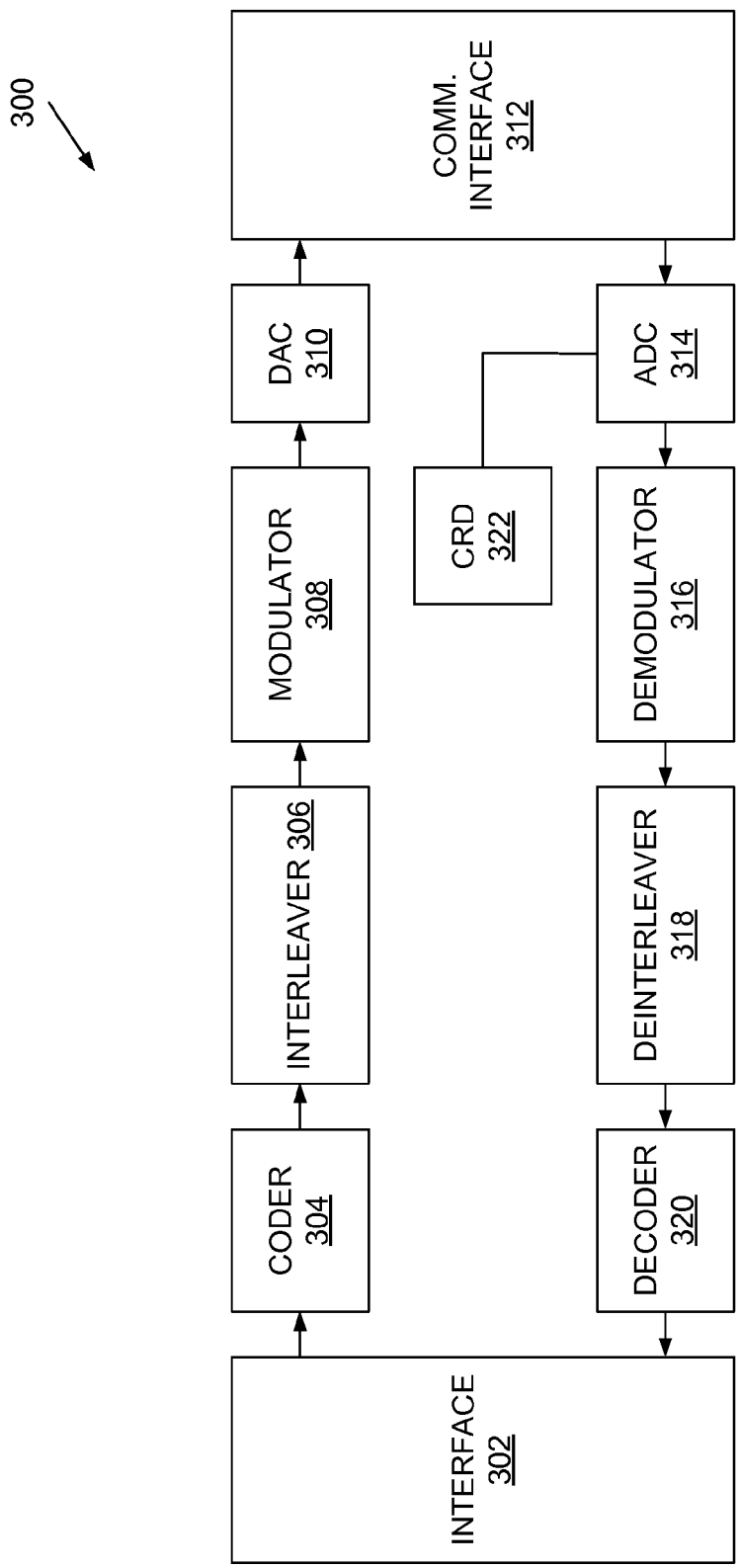
FIG. 3 is a block diagram of an example computer system in which certain embodiments of a coding system may be implemented.

Disclosed herein are certain embodiments of a coding system and method that guarantee a pair of sync bits in a transcoded block will appear on the same physical lane. Embodiments may then use this property for data synchronization and to guarantee a bit transition in a certain amount of time on a physical lane. Embodiments of a coding system and process for configuring alignment markers are also disclosed.

This disclosure discusses embodiments of methods, architectures, and systems for a forward error correction (FEC) coding scheme for 100G-KR and Copper Cable Systems. The FEC coding scheme is described in R. Blahut, "*Theory and Practice of Error control codes*," Addison Wiley, 1983, which is incorporated herein in its entirety. The disclosed embodiments can be used in other applications as well.

For 100 G Ethernet, the scheme may have 20 Virtual Lanes (denoted as VLs) per 100 G data stream. Each VL has a data-rate of about 5 Gbps. There could be various configurations for physical lanes (denoted as PLs), e.g., 4×25 G, 2×50 G, etc. FEC coding can be done 1) over each VL, 2) over each PL, or 3) across PLs.

I. Reed-Solomon (RS) Encoding Based on 256B/258B Transcoding

A. 256B/258B Transcoding

One embodiment of a transcoding scheme that may be utilized works in a similar way as 512B/514B transcoding, where the 512B/514B transcoding is described in M. Teshima, etc, "*Bit-Error-Tolerant (512\*N)B/(513\*N+1)B Code for 10Gb/s and 100Gb/s Ethernet Transport*," IEEE Infocom Workshops 2008, which is incorporated herein in its entirety. The major difference is that 2 bits are only needed for the index of an original 66-b block position while 512B/514B transcoding needs 3 bits. Thus, the $3^{rd}$ bit in the 3-bit position field may be used as the parity of 1-bit flag, 2-bit position index, and 4-bit control block type.

B. 256B/258B Transcoding Architecture

FIG. 1 shows one embodiment of the architecture for 256B/258B transcoding. In the figure, the "comb" block denotes combinatorial logic to generate data bits during transcoding. One embodiment of the reverse transcoding architecture is shown in FIG. 2, where the output from 2:1 Mux is 130 bits. However, the output of the last register is 132 bits. Basically, each 65-bit block is converted to a 66-bit block. Specifically, for each sync bit in a 65 bit block, it is expanded, as 2-bits, e.g., "0" becomes "01" and "1" becomes "10" in 66-bit block at the output side. Here, in the transcoding stage, the sync bit is set as "0" for transcoding blocks of pure data, otherwise it is set as "1". FIG. 1 and its operation are also discussed in subsequent sections.

C. FEC Code Based on 256B/258B Transcoding

In one embodiment, RS(544, 516, t=14, m=10) is used for 100G-KR systems based on 256B/258B transcoding, where the above RS(N, K, t) denotes a Reed-Solomon code with total source data of K symbols; total coded data of N symbols; guaranteed error correcting capacity of t symbols; and symbol size of m bits. The input data to transcoded block will be (66\*4)\*20 bits. After transcoding, 258\*20=5160 bits are obtained. These 5160 bits will be sent to the FEC encoder. After FEC encoding, 5440 bits or 544 RS symbols are obtained. This FEC code has impressive coding gain and reasonable latency and complexity.

Accordingly, embodiments of the present disclosure are suited for a special RS code to meet special requirements for 100G-KR systems. In particular, with the disclosed transcoding, an RS code can be used to achieve significantly better coding gains (than current available options) while meeting the latency requirement. Also, for 100 G backplane and copper cable systems, transcoding is suggested to be used together with error correction codes, in embodiments of the present disclosure. Error correction codes are discussed in Z. Wang, etc., "*Further Studies on FEC Codes for 100G KR*", IEEE p802.3bj, November 2011, which is incorporated herein in its entirety.

Embodiments of the present disclosure include methods for allocating sync bits for two transcoding schemes, such as 256B/258B transcoding and 512B/514B transcoding schemes. The details of 512B/514B transcoding (TC) are described in M. Teshima, etc., "*Bit-Error-Tolerant (512\*N) B/(513\*N+1)B Code for 10Gb/s and 100Gb/s Ethernet Transport,*" IEEE Infocom Workshops 2008, which is incorporated herein in its entirety.

The 256B/258B TC may work similarly as 512B/514B TC. Specifically, the 1-bit flag field and the 4-bit control block type words are used exactly as in the case of 512B/514B, in some embodiments. The 3-bit position field is used differently. Since a 256-bit block only contains four 64-bit blocks, two bits are used instead of three bits as in 512B/514B case to indicate the position of a 64-bit block within a 256-bit large block. In some embodiments, the third bit is used as the (even or odd) parity bit of the other 2 bits for error detection. In some other embodiment, the third bit is used as the parity bit of 1-bit flag, 2-bit position index, and 4-bit control block type. To protect burst error effect on the sync bits, the two sync bits are separated. In one system, the sync bits are separated as follows:

$1^{st}$ sync bit+128-bit data $2^{nd}$ sync bit+128-bit data→258-bit block. In this approach, however, there is no guarantee that a pair of sync bits in a transcoded block will appear on the same physical lane. Without loss of generality, consider a 4×25 G system. Assume each physical lane provides 33 bits (better for 256B/258B TC) or 66 bits of data (better for 512B/514B TC) per cycle. After getting 264-bit data (in 256B/258B case) or 528-bit data (in 512/514B case), the corresponding transcoding is performed. Embodiments of the present disclosure implement a new method to allocate the sync bits to ensure each physical lane gets a pair of sync bits once in a while (periodically or quasi-periodically).

D. 512B/514B Transcoding Example

As mentioned in the above discussion, a pair of two sync bits is to be separated, in one embodiment. Let's assume transcoded data will be distributed in a group of 10 bits when an RS code is defined over GF($2^{10}$) and is employed with the specific TC scheme.

First of all, the $2^{nd}$ sync bit is allocated at the distance d=10\*4\*L (e.g., L=7, d=280 bits) after the $1^{st}$ sync bit. Note, d should be an integer around 514/2=257, in one embodiment. This fixed distance between a pair of sync bits will help implementation in data synchronization.

One embodiment of the general allocating scheme works as follows. The first sync bit in location s[1] (location counter starts from 1) is allocated, then after d=40L (e.g., d=280) bits, the $2^{nd}$ sync bit is allocated. This completes a first 514B block in a FEC (forward error correction) block. Then, the first sync bit in location s[2] is allocated within the second 514B block. After 40L (e.g., d=280) bits, the $2^{nd}$ sync bit is allocated within the second 514B block, and so on.

For instance, if an s array is set as follows:
s=[80 100 80 90 70 80 60 80 50 30], the sync bits will be sure to appear in a pair in each physical lane. In particular, it will appear in following (physical lane number) sequence:
0, 1, 2, 3, 0, 1, 2, 3, 0, 1.

As one RS(528, 514, t=7, m=10) block consist of 5280 bits, the above sequence completes an FEC block. For the next FEC block, the same sequence can be repeated, in one embodiment. If another s array is used, such as, e.g.,
s=[100 80 60 70 90 60 80 60 70 50], the sync bits will appear in following sequence:
2, 3, 0, 1, 2, 3, 0, 1, 2, 3.
In this way, one period with two FEC blocks is completed, in some embodiments.

E. 256B/258B Transcoding Example

Sync bits can be allocated in a similar way as previously done for 512B/514B TC. In this case, d=120 can be set. Note that 20×258 bits exist for an FEC block. Here is one exemplary s array:
s=[70 70 60 50 50 40 30 30 60 50 80 80 70 60 60 50 40 40 70 60].
The sync bits will appear in different lanes as follows:
3, 0, 1, 2, 3, 0, 1, 2, . . . , 3, 0, 1, 2.

It should be mentioned that by adjusting s array contents, the sequence for sync bits to appear in physical lanes can be changed. Sync bit locations in a 10-bit symbol can also be changed.

In addition, the above discussion is based on 10-bit multi-lane interleaved scheme. Other multi-bit multi-lane interleaving schemes can be used, in some embodiments. For instance, 20-bit interleaving with four physical lanes can be utilized, in one embodiment. In this case, the first 20 bits for lane 0 is allocated; then, the next 20 bits for lane 1 are allocated, then lane 2, then lane 3, and so on; and then repeated with lane 0. In alternative schemes, values for the s array and d can change accordingly to ensure any pair of sync always appears on the same physical lane.

Referring now to FIG. 3, shown is an example environment in which certain embodiments of coding systems and methods may be implemented. In particular, FIG. 3 shows an example embodiment of a high speed Ethernet computer system 300. One having ordinary skill in the art should appreciate in the context of the present disclosure that the example environment is merely illustrative, and that other computer systems and/or architectures may be implemented in some embodiments. The computer system 300 comprises an interface (e.g., to the Ethernet or component(s) coupled thereto), and on a bit stream sending side, a coder 304, interleaver 306, modulator 308, and digital-to-analog converter (DAC) 310 coupled to a communications interface 312. On the receiving side, starting from the communications interface 312, the computer system 300 comprises an analog-to-digital converter (ADC) 314, a demodulator 316, a deinterleaver 318, and a decoder 320, the latter coupled to the interface 302. Also depicted is a clock recovery device (CRD) 322, which may include one or more phase-locked loop circuits and/or software clocking mechanisms, among other clock recovery systems well-known to those having ordinary skill in the art.

The interface 302 and communications interface 312 comprise any one of a plurality of Ethernet interfaces suitable for sending and receiving bit streams according to 100G-KR media, including IEEE 802.3-based 100Gigabits/second (Gb/s) Ethernet electrical backplanes and copper cable (e.g., twinaxial) links, as well as suitable for maintaining backwards compatibility to legacy systems interfaces (e.g., for 10GBase, etc.), XAUI backplanes, etc. The bit stream from the interface 302 may comprise virtual and physical lanes in some embodiments. For instance, for 100 G Ethernet, the bit stream may be carried over twenty (20) virtual lanes per 100 G data stream over one or more physical lanes. In one embodiment, each virtual lane has a data-rate of five (5) Gbps.

There may be various configurations for the associated physical lanes, such as four (4) physical lanes×25 G, two (2) physical lanes×50 G, etc.

The coder 304 receives the bit streams over the aforementioned lanes and implements transcoding and FEC encoding functionality. In some embodiments, the coder 304 may employ one or more other FEC codes on the transcoded bit stream, including Fire codes or other error correcting codes such as BCH (Bose, Chaudhuri, and Hocquenghem) codes, Reed-Solomon (RS) codes, convolutional codes, turbo codes, and/or LDPC (low-density parity-check) codes, among others. The coder 304 employs FEC coding over each virtual lane, each physical lane, or across physical lanes. For purposes of facilitating the description that follows, an embodiment where FEC encoding is performed across physical lanes is assumed.

The output of the coder 304 is provided to an interleaver 306, which is configured to interleave the correction codes provided by the FEC encoder and provide the codes along with the data streams over plural channels. In some embodiments, the quantity of independent codes may be different (e.g., greater than or less than five). In some embodiments, bit interleaving is commonly used in digital communications to combat long burst errors. In some embodiments, a burst-interleaving technique is employed.

Continuing with the description of FIG. 3, the modulator 308 receives the plural streams from the interleaver 306 and implements one of plural types of modulation schemes, such as QPSK, QAM, FSK, among other known modulation schemes. The modulated data is provided to the DAC 310, which prepares frames of data according to an analog signal and provides the analog signal over the communications interface 312 to another network or device.

On the receiving side, bit streams received over the communications interface 312 are digitized by ADC 314 and clocked according to the CRD 322, demodulated by demodulator 316, deinterleaved 318, and provided to decoder 320 to perform error detection and/or correction of the source data for provision to the interface 302 and ultimately another component or system of the computer system 300 or another device or network.

Figure 4:
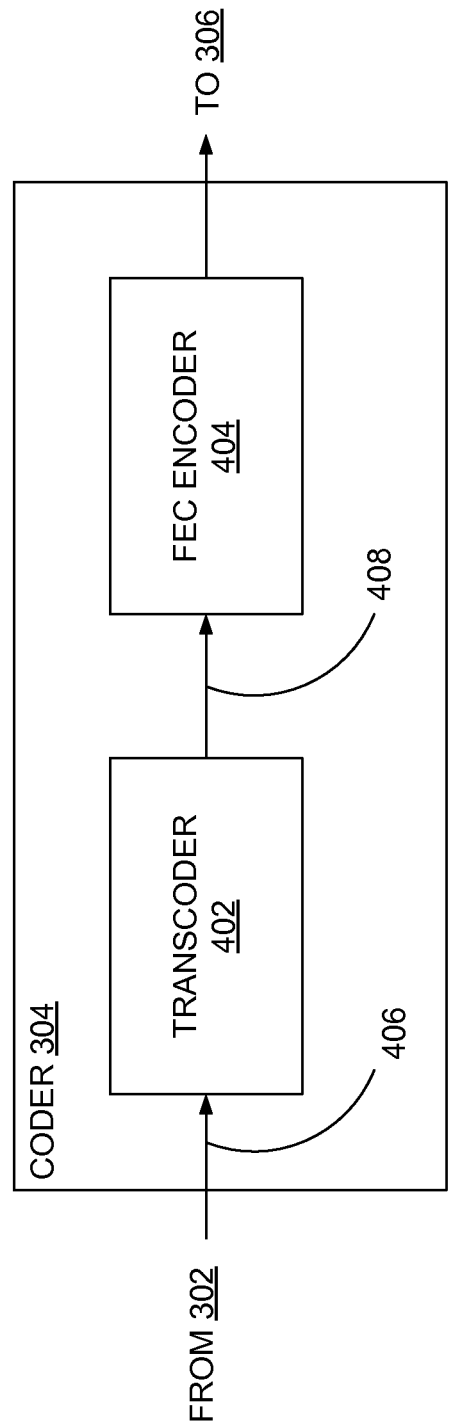
FIG. 4 is a block diagram of an example embodiment of a coding system.

Having generally described an example computer system 300, attention is directed to FIG. 4, which shows an example embodiment of a coding system embodied as the coder 304. In some embodiments, the coding system may be embodied with fewer or more components. Embodiments of the coding system may employ one or more of the components illustrated in FIG. 3 or other components. For instance, some embodiments of a coding system may employ the coder 304 and the interleaver 306. One having ordinary skill in the art should appreciate in the context of the present disclosure that the example coder 304 is merely illustrative, and that other architectures and/or components may be implemented as the coder 304 in some embodiments. The coder 304 comprises a transcoder 402 coupled at its output to a forward error correction (FEC) encoder 404. Although shown as respective single units, in some embodiments, respective multiple units of similar configuration may be employed. The transcoder 402 receives a bit stream from the interface 302 (FIG. 3) over medium 406, which may comprise virtual and physical lanes in some embodiments. For instance, for 100 G Ethernet, the bit stream may be carried over twenty (20) virtual lanes per 100 G data stream over one or more physical lanes on connection 406. In one embodiment, each virtual lane has a data rate of five (5) Gbps, though not limited to five (5) Gbps. There may be various configurations for the associated physical lanes, such as four (4) physical lanes×25 G, two (2) physical lanes×50 G, etc. The transcoder 402 processes these bit streams according to one or more transcoding methods, as explained below.

The FEC encoder 404 receives the transcoded bit streams over connection 408 and employs FEC coding over each virtual lane (VL), each physical lane (PL), or across physical lanes. In some cases, transcoding is performed on each VL, on each PL, or across PLs. As described above, FEC encoding across physical lanes is described, with the understanding that similar principles apply for encoding over (or on) virtual lanes and/or physical lanes. Here transcoding is assumed to be performed across PLs. In some embodiments, FEC coding is implemented using a redundancy ratio (RR) suitable for use in 100G-KR (e.g., 1/65). In some embodiments, the redundancy ratio is increased to obtain a higher coding gain, for instance by adding redundancy bits into one or more 66-bit blocks.

Referring to FIG. 4, one embodiment of the transcoder 402 is configured to perform 512B/514B transcoding. In general, the transcoder 402 is configured to transfer eight 66-bit blocks into a large block of 514 bits. For instance, each physical lane provides source data of 20×66-bit blocks. The transcoder 402 combines 2×66-bit blocks from each physical lane to form a 528-bit large block. The transcoder 402 then employs 512B/514B transcoding to generate 514-bit data and sends the data to the FEC encoder 404. In one embodiment, the FEC encoder 404 may be configured for encoding based on RS(528, 514, t=7) defined over $GF(2^10)$. One of a plurality of different implementation options may be employed by the FEC encoder 404 for this RS code.

For instance, in one embodiment, the FEC encoder 404 gets (e.g., accesses, such as from memory or registers) sixteen (16) symbols (e.g., 160 bits) for the first thirty-two (32) cycles and gets two (2) symbols at the last cycle per each frame. Alternatively, the FEC encoder 404 may receive two symbols at the first cycle and sixteen symbols for each of the remaining 32 cycles. The FEC encoder 404 sends out sixteen (16) symbols per cycle with each physical lane transmitting four (4) symbols per cycle. In this implementation, it takes thirty-three (33) cycles to transmit an FEC frame. A decoder, such as decoder 120, receiving such a bit stream may take (e.g., receive or access) sixteen (16) symbols per cycle with a total of thirty-three (33) cycles to receive data of each FEC frame. Alternatively, the decoder may take twenty-four (24) symbols per cycle with a total of twenty-two (22) cycles to receive data of each FEC coded frame.

Referring now to FIG. 5, shown is an example embodiment of an architecture for 512B/514B transcoding. For instance, FIG. 5 shows transcoding module 402A. In FIG. 5, the transcoding module 402A corresponds to the transcoder 402, and comprises plural registers 502 (e.g., 264-bit register), 506 (e.g., 257-bit register), and 510 (e.g., 257-bit register), combinational logic 504, and a multiplexer 508 (e.g., 2:1) with a select (SEL) port. Data X[263:0] is received at the register 502 and provided also to combinational logic 504. The output of the combinational logic 504 comprises early part E[256:0] to the input of multiplexer 508 and later part L[256:0] to the input of the register 506, the latter which provides the other input to the multiplexer 508. In other words, the combinational block 504 generates data bits with the split synch bits as described above or in any other predetermined way. The multiplexer 508 outputs to the register 510 the multiplexed data, and the output of the register 510 comprises output data Y[256:0]. In operation, the select signal, SEL, is set to ensure the early part of 514 bits, i.e., E[256:0] is sent one cycle earlier than the corresponding later part of 514 bits, i.e., L[256:0]. In either branch of 257-bit data, one sync bit is included, and the rest is data and/or control portions.

Referring to FIG. 6, shown is an example embodiment of a reverse transcoding (512B/514B) module 402B (corresponding to an embodiment of transcoding module 402 in FIG. 4) that comprises registers 602 (e.g., 257-bit register), 606 (e.g., 260-bit register), and 610 (e.g., 264-bit register), combinational logic 604, and multiplexer 608 (e.g., 2:1). Data Y[256:0] is received at the register 602 and also at the combinational logic 604. The combination logic 604 outputs data early part E[259:0] to the input of multiplexer 608. The combinational logic 604 also outputs data later part L[259:0] to the register 606, the latter which outputs data to the input of the multiplexer 608. The multiplexer 608 outputs data to register 610, which in turn outputs data Z[263:0]. In operation, where the select signal, SEL, is set to ensure the early part of 520 bits, i.e., E[259:0] is sent one cycle earlier than the corresponding later part of 520 bits, i.e., L[259:0]. At the output side of the 2:1 multiplexer 608, the data is in a format of 4×65 bits, where one sync bit is included in each 65-bit sub-block. There is a simple logic operation to convert each one (1) sync bit into two (2) sync bits, i.e., 1->10 and 0->01, in the connection to the final output register 610. Additionally, sync bits are used to identify boundaries for transcoded blocks, as has been discussed. The sync bits may be separated and spaced in accordance with the disclosed embodiments to ensure that the pair of bits occur on the same physical lanes.

Although certain embodiments of a coding system have been disclosed based on a 512B/514B transcoding method, it should be appreciated within the context of the present disclosure that the above example RS codes (or other codes) may be implemented by the FEC encoder 404 based on implementation by the transcoder 402 of other transcoding schemes. For instance, in one embodiment, RS encoding may be based on a 256B/258B transcoding method implemented in similar manner to that described above for 512B/514B transcoding methods. Specifically, as is known, a 1-bit flag field and 4-bit control block type words are used in 512B/514B schemes. Operation is the same in this use of the 1-bit flag field and the 4-bit control field in the coding system embodiment that is based on 256B/258B transcoding. In addition, a 3-bit position field is used in 256B/258B, as is known for 512B/514B, with a difference. In particular, as a 256-bit block only contains four (4) 64-bit blocks, only two (2) bits instead of three (3) bits (the latter for the 512B/514B case) are used to indicate the position of a 64-bit block within a 256-bit large block. The third bit may be used as a parity bit for the other two (2) bits, such as for error detection.

Referring back to FIGS. 1-2, shown are embodiments of a transcoding architecture and a reverse transcoding architecture for 256B/258B transcoding, respectively. As noted previously in FIGS. 5-6, similar architectures may be derived for 512B/514B transcoding, with at least one difference exhibited by the data bus-width for each signal in the data flow. For instance, FIG. 1 shows transcoding module 402C and FIG. 2 shows reverse transcoding module 402D. In FIG. 1, the transcoding module 402C corresponds to the transcoder 402, and comprises plural registers 102 (e.g., 132-bit register), 106 (e.g., 129-bit register), and 110 (e.g., 129-bit register), combinational logic 104, and a multiplexer 108 (e.g., 2:1), similar to that shown for FIGS. 5-6. Data X[131:0] is received at the register 102 and provided also to combinational logic 104. The output of the combinational logic 104 comprises early part E[128:0] to the input of multiplexer 108 and late part L[128:0] to the input of the register 106, the latter which provides the other input to the multiplexer 108. In other words, the combinational logic 104 generates data bits with the split synch bits as described above or in any other predetermined way. The multiplexer 108 outputs to the register 110 the multiplexed data, and the output of the register 110 comprises output data Y[128:0].

With reference to FIG. 2, the reverse transcoding module 402D comprises registers 202 (e.g., 129-bit register), 206 (e.g., 129-bit register), and 210 (e.g., 132-bit register), combinational logic 204, and multiplexer 208 (e.g., 2:1). Data Y[128:0] is received at the register 202 and also at the combinational logic 204. The combinational logic 204 outputs data (late part) L[129:0] to the input of multiplexer 208. The combinational logic 204 also outputs data (early part) E[129:0] to the register 206, the latter which outputs data to the input of the multiplexer 208. The multiplexer 208 outputs data to register 210, which in turn outputs data Z[131:0]. The data Z is in a format of 2×66 bits, where a 66-bit block comprises two (2) sync bits and sixty-four (64) bits of data or control block. Note that the output of the multiplexer 208 is one-hundred thirty (130) bits, whereas the output of the register 210 is one-hundred thirty-two (132) bits. The reverse transcoding module 402D converts the 65-bit block to a 66-bit block.

Figure 7:
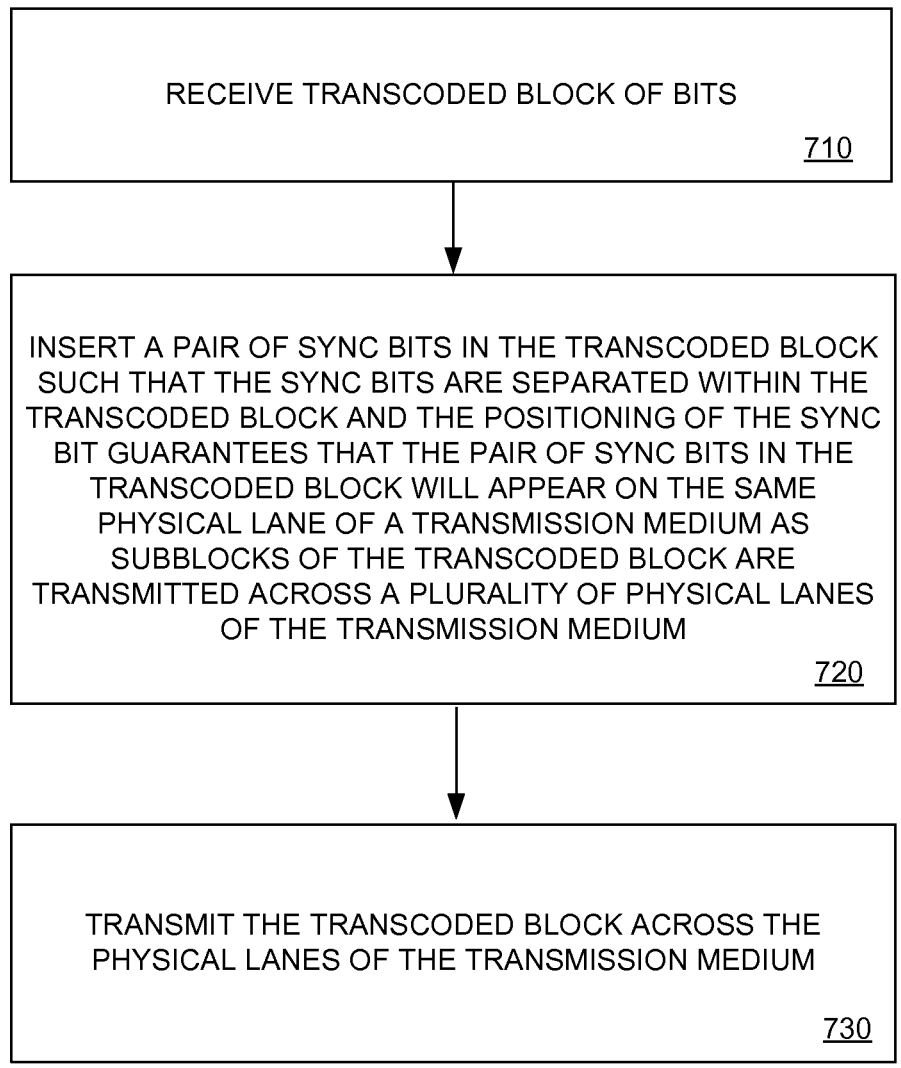
FIG. 7 is a flow diagram of an example embodiment of a coding method.

Having described certain embodiments of coding systems, one coding method embodiment, illustrated in FIG. 7 and denoted as method 700 comprises receiving (710) transcoded block (e.g., FEC block) of bits and inserting (720) a pair of sync bits such that the sync bits are separated within the transcoded block and the positioning of the sync bit guarantees that the pair of sync bits in the transcoded block will appear on the same physical lane during transmission of subblocks of the transcoded block in a round robin manner across a plurality of physical lanes of a transmission medium. For instance, a pair of sync bits may be designated as A, B where A is a first of the sync bits to be positioned in a FEC block and B is the second of the sync bits to be positioned after A is positioned in the FEC block. Positioning of the A sync bit within a transcoded block may be specified by an s array, where the relative positioning of the A, B sync bits may change from transcoded block to transcoded block ensuring that each pair of sync bits appears in each physical lane according to a predefined lane number sequence.

For instance, the s array may be as follows:
s=[80 100 80 90 70 80 60 80 50 30].

After insertion of the sync bits, the transcoded block is transmitted (730) across the physical lanes of the transmission medium.

Referring back to FIG. 3, certain above-described embodiments of coding systems and methods may be implemented in the depicted environment. In such an embodiment, the output of the coder 304 is provided to the interleaver 306, which is configured to interleave the error correction codes provided by the FEC encoder and provide the codes along with the data streams over plural channels. In some embodiments, systems perform bit-interleaving, among others.

With 64B/65B transcoding (TC), RS code symbol of 10 bits may be selected, and symbol interleaving may be used for multiple lanes. In this way, the data sequence on each physical lane may be maintained after FEC encoding and data redistribution. Alignment markers then remain the same on each PL (physical lane) after TC, FEC encoding, and data redistribution.

If using 256B/258B TC, there are exactly 5 transcoding blocks per AM group: 20×66 bits=5×(4×66 bits)=>5×258 bits. With 512B/514B TC, the process becomes much more complicated. Consider using RS(528, 514, 7, 10) with 512B/514B TC. For 20 virtual lanes, there are 20×66 bits=>2× 514B+4×66 bits per AM group.

In one embodiment, the first 16 66-bit alignment marker (AM) blocks are treated in the following way while the remaining 4 AM blocks are treated as data (e.g., only need to change sync bits in transcoding (TC) and reverse transcoding (RTC)) blocks.

Figure 8:
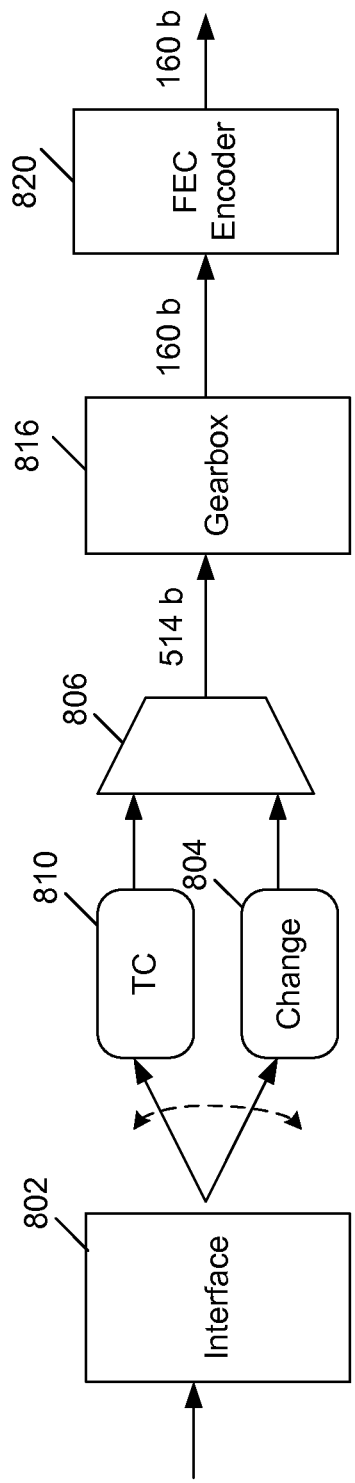
FIG. 8 is a block diagram of an example embodiment of a coder of FIG. 3 in accordance with embodiments of the present disclosure.
Figure 9:
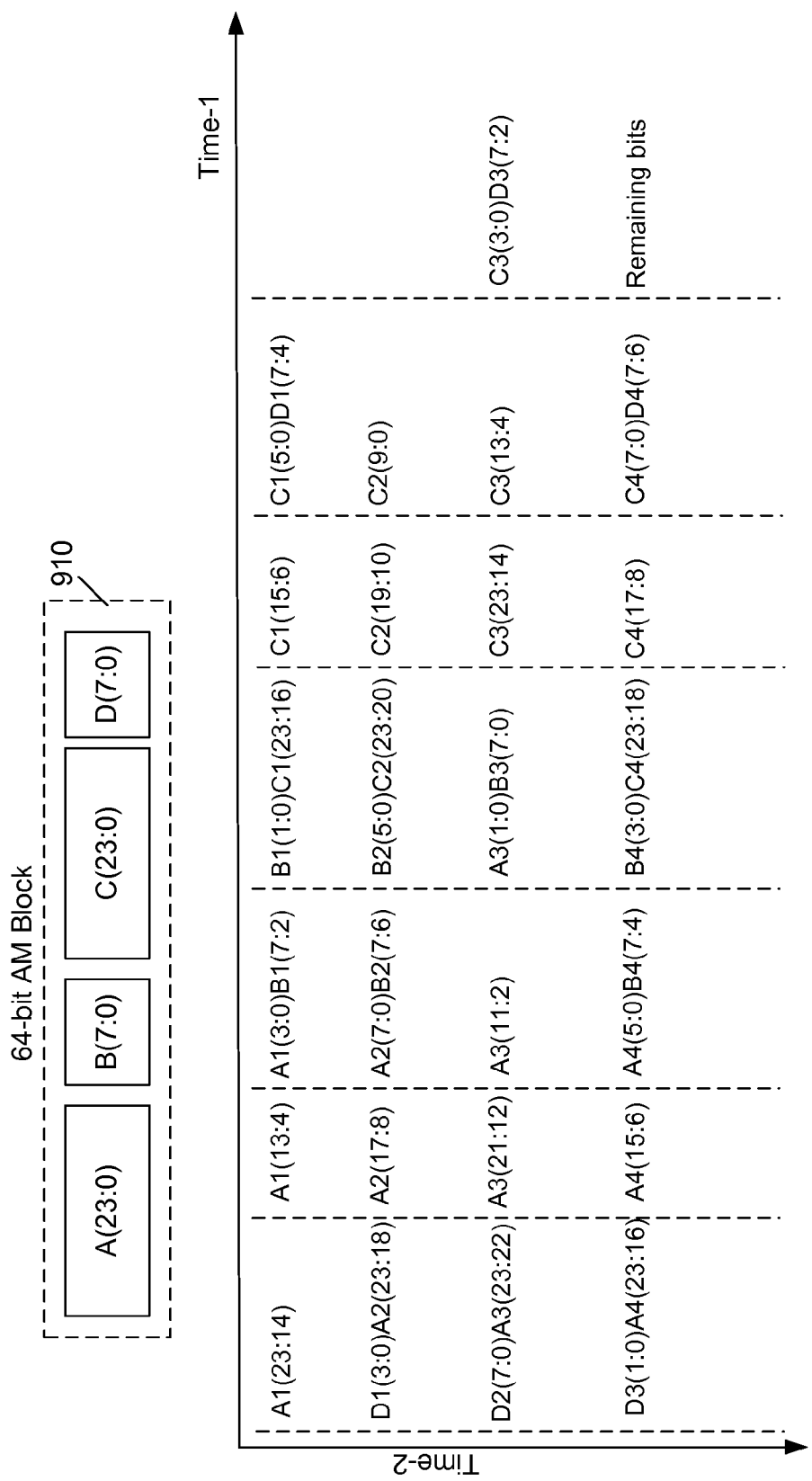
FIG. 9 is a diagram of an exemplary data representation of a predetermined alignment marker in accordance with embodiments of the present disclosure.

As represented in FIG. 8, if the input to TC 810 is all AM blocks at an interface stage 802, pre-determined 514 bits are sent to the FEC encoder 820 at the change stage 804. With 16 AM blocks, TC stage should output 2×514=1028 bits. Here, 250 bits per PL can be forced as 3×64-bit AM blocks+first 58 bits of the 4$^{th}$ 64-bit AM block. The remaining 28 bits will be distributed as follows: 1) PL#0 gets 10 bits, 2) PL#1 gets 10 bits, 3) PL#2 gets 8 bits, 4) PL#3 gets 0 bit. For the remaining 4 AM blocks, they can be recovered after FEC decoding based on previous AM information. Note, if the TC and FEC are simply bypassed, the hardware design becomes much more complicated. FIG. 9. shows the predetermined data patterns of 1028 bits (four 64-bit alignment markers (910) plus remaining tail bits (e.g., four tail bits) that can be utilized in transmission over four physical lanes, where 60×4×3+70×4× 1+7×4=250×4 lanes+10 bits+10 bits+8 bits=1028 bits. For example, the four tail bits may be distributed to PL#2.

In FIG. 9, item 910 shows data format of a 66-bit AM block without 2 sync bits. Item A corresponds to 24 most significant bits and D array correspond to 8 least significant bits. Since each PL has five AM blocks together, the corresponding A arrays are labeled as A1, A2, A3, A4, and A5 in sequence. B, C and D arrays are labeled similarly.

Assume AM blocks at different PLs have exactly the same values. The pre-determined data mapping shown in FIG. 9 should be interpreted as the following:

[A1(23:14)×4, A1(13:4)×4, {A1(3:0), B1(7:2)}×4, ..., {D1(3:0), A2(23:18)}×4, A2(17:8)×4, ..., {C4(7:0), D4(7:6)}×4, remaining 28 bits].

Note, the remaining 28 bits will contribute 10 bits to PL#0, 10 bits to PL#1, and 8 bits to PL#2. These 28 bits can be any predetermined data pattern.

In case the corresponding arrays from different PLs are different, the simple duplication by 4 times, e.g., A1(23:14)× 4, in the above format should be changed to A1(23:14) from PL#0, then A1(23:14) from PL#1, ..., A1(23:14) from PL#3.

Next, consider using RS(544, 516, 14, 10) with 256B/258B TC. For twenty virtual lanes, there are 20×66 bits=>5×258B. The twenty 66-bit AM blocks can be treated, as represented in FIG. 10.

As shown in the figure, if input to TC 1010 is four AM blocks at interface stage 1002, pre-determined 258 bits based on 264-bit input data is sent to the FEC encoder 1020 at the change stage 1004. With twenty AM blocks, there will be a total of five TC blocks, which amounts to 1290 bits. On each PL, 1280/4=320 bits can be forced as 5×64-bit AM blocks. The remaining 10 bits can be set as "1010101010" or "0101010101" or any other predetermined 10-bit data pattern and will be distributed to PL#0. The pre-determined data mapping scheme can be obtained similarly as done for 512B/ 514B TC.

Figure 10:
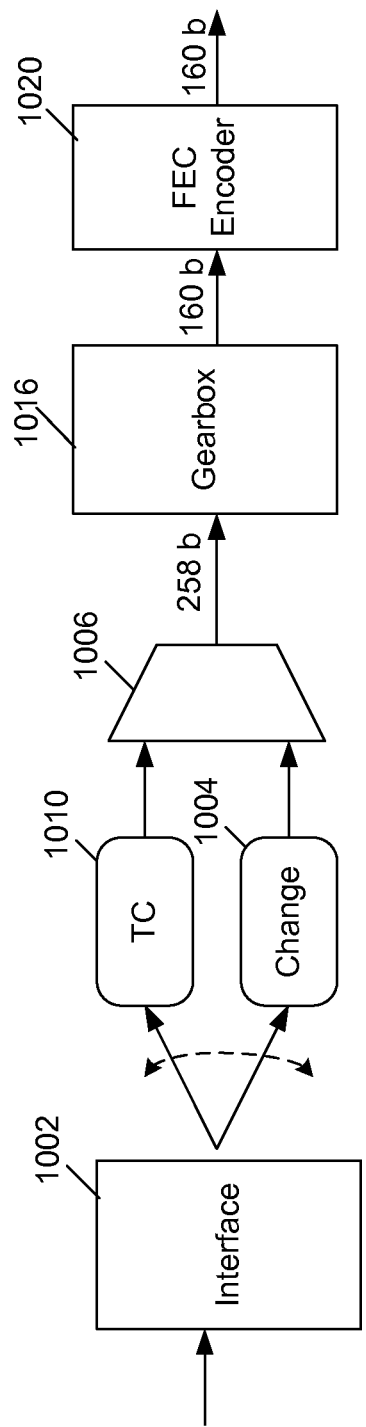
FIG. 10 is a block diagram of an example embodiment of a coder of FIG. 3 in accordance with embodiments of the present disclosure.
Figure 11:
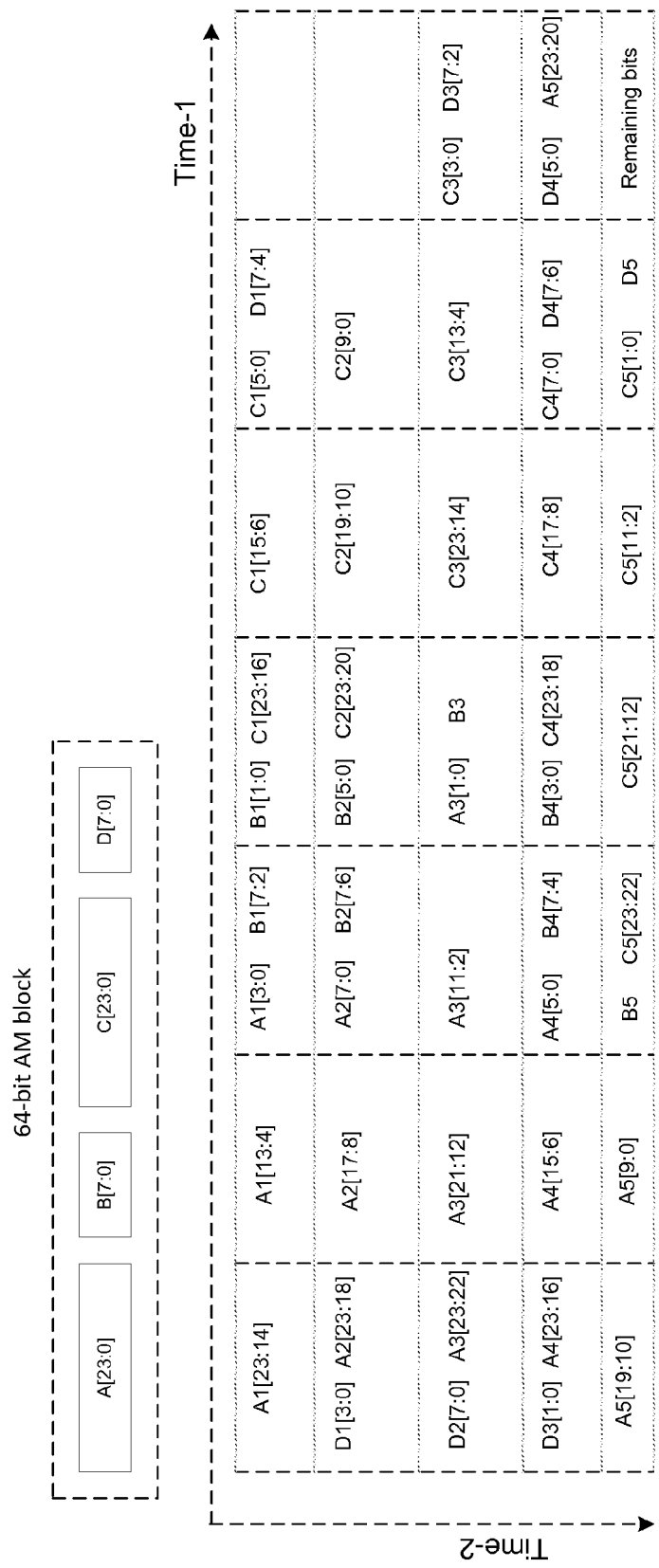
FIG. 11 shows the data mapping when using 256B/257B transcoding in accordance with one embodiment.

Referring back to FIG. 8 and/or FIG. 10, alignment marker blocks may be combined with transcoded data, in stage 806 or stage 1006, to generate an output that is passed to a gearbox 816, 1016 (plus FIFO buffers) to generate a plurality of code systems, where the plurality of code symbols may be encoded by FEC encoder 820, 1020. Therefore, in accordance with the disclosed embodiments, the data flow in transcoding and FEC encoding/decoding can be made regular and the implementation complexity overhead is minimal. Similar to 256B/ 258B transcoding, for a 256B/257B transcoding scheme, 4×66-bit input data is mapped to 257 bits with 1 sync bit to indicate whether or not there is at least one control block in the group of 4 66-bit blocks. The pre-determined 257b× 5=1285-bit data mapping pattern is shown in FIG. 11 for AM blocks, in accordance with one embodiment. This is almost the same as the case with 256B/258B TC except that there are 5 remaining bits instead of 10 remaining bits. The remaining 5 bits can be any predetermined data pattern.

In some embodiments, the coding systems of FIGS. 8 and/or 10 may be embodied with fewer or more components. In some embodiments, the coding system may employ one or more of the components illustrated in FIG. 8 or other components. One having ordinary skill in the art should appreciate in the context of the present disclosure that the example coder is merely illustrative, and that other architectures and/ or components may be implemented as the coder in some embodiments. The coder 304 comprises a transcoder 810, 1010 coupled at its output to a forward error correction (FEC) encoder 820, 1020. Although shown as respective single units, in some embodiments, respective multiple units of similar configuration may be employed. The transcoder 810, 1010 receives a bit stream from the interface 302 (FIG. 3) over a medium, which may comprise virtual and physical lanes in some embodiments. For instance, for 100 G Ethernet, the bit stream may be carried over twenty (20) virtual lanes per 100 G data stream over one or more physical lanes. In one embodiment, each virtual lane has a data rate of five (5) Gbps, though not limited to five (5) Gbps. There may be various configurations for the associated physical lanes, such as four (4) physical lanes×25 G, two (2) physical lanes×50 G, etc. The transcoder 810, 1010 processes these bit streams according to one or more transcoding methods, as explained herein.

The FEC encoder 820, 1020 receives the transcoded bit streams over a connection from gearbox (plus FIFO buffers) 816, 1016 and employs FEC coding over each virtual lane (VL), each physical lane (PL), or across physical lanes. In some cases, transcoding is performed on each VL or on each PL. As described above, FEC encoding across physical lanes is described, with the understanding that similar principles apply for encoding over (or on) virtual lanes and/or physical lanes. Here transcoding is assumed to be performed across PLs.

For instance, each physical lane provides source data of 20×66-bit blocks. The transcoder 810 combines 2×66-bit blocks from each physical lane to form a 528-bit large block. The transcoder 810 then employs 512B/514B transcoding to generate 514-bit data and sends the data to the FEC encoder 820. In one embodiment, the FEC encoder 820 may be configured for encoding based on RS (528, 514, t=7) defined over GF(2^10). One of a plurality of different implementation options may be employed by the FEC encoder 820 for this RS code.

In addition, in one embodiment, the FEC encoder 820 gets (e.g., accesses, such as from memory or registers) sixteen (16) symbols (e.g., 160 bits) for the first thirty-two (32) cycles and gets two (2) symbols at the last cycle per each frame. Alternatively, the FEC encoder 820 may get two symbols at the first cycle and get sixteen symbols for each of the remaining 32 cycles. The FEC encoder 304 sends out sixteen (16) symbols per cycle with each physical lane getting four (4) symbols per cycle. In this implementation, it takes thirty-three (33) cycles to transmit an FEC frame. A decoder receiving such a bit stream may take (e.g., receive or access) sixteen (16) symbols per cycle with a total of thirty-three (33) cycles to receive data of each FEC frame. Alternatively, the decoder may take twenty-four (24) symbols per cycle with a total of twenty-two (22) cycles to receive data of each FEC coded frame. The decoder may also take twelve (12) symbols per cycle with a total of forty-four (44) cycles to receive data of each FEC coded frame.

In another embodiment utilizing RS (528, 514, t=7) codes, a second implementation comprises a FEC encoder getting (e.g., accessing) twenty-four (24) symbols (e.g., 240 bits) for the first twenty-one (21) cycles and get ten (10) symbols at the last cycle per each frame or vice versa. The FEC encoder sends out twenty-four (24) symbols per cycle with each physical lane getting six (6) symbols per cycle. In practice, each PL gets 6 symbols per cycle in a digital clock domain. After SERDES, 1 or 2 bits per cycle are transmitted depending on NRZ or PAM4 modulation. Stated otherwise, it takes twenty-two (22) cycles to transmit an encoded FEC frame. For a decoder, such as decoder 820 (FIG. 8), operating on these coded symbols, the decoder 820 takes sixteen (16) symbols per cycle with a total of thirty-three (33) cycles to receive data of each FEC frame. Alternatively, the decoder 120 takes twenty-four (24) symbols per cycle with a total of twenty-two (22) cycles to receive data of each FEC coded frame.

Continuing with the description of FIG. 3, the modulator 308 receives the plural streams from the interleaver 306 and implements one of plural types of modulation schemes, such as QPSK, QAM, FSK, NRZ, PAM4, among other known modulation schemes. The modulated data is provided to the DAC 310, which prepares frames of data according to an analog signal and provides the analog signal over the communications interface 312 to another network or device.

On the receiving side, bit streams received over the communications interface 312 are digitized by ADC 314 and clocked according to the CRD 322, demodulated by demodulator 316, deinterleaved 318, and provided to decoder 320 to perform error detection and/or correction of the source data for provision to the interface 302 and ultimately another component or system of the computer system 300 or another device or network.

Figure 12:
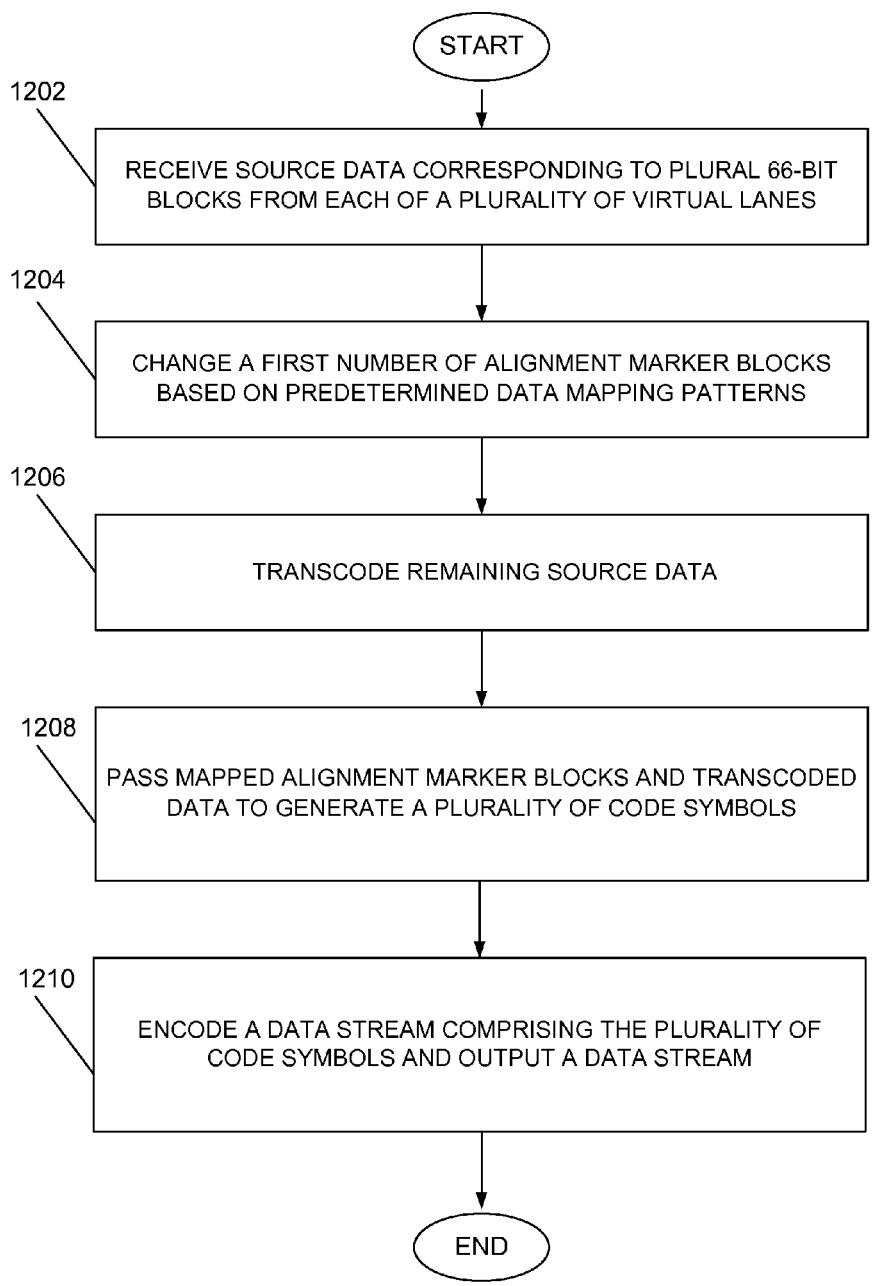
FIG. 12 is a flow diagram of an example embodiment of a coding method.

Having described certain embodiments of coding systems, one coding method embodiment, illustrated in FIG. 12, comprises receiving (1202) source data corresponding to plural 66-bit blocks from each of a plurality of virtual lanes; replacing or changing (1204) a first number of alignment markers based on predetermined data mapping patterns, wherein transcoding is bypassed for the first number of alignment markers; transcoding (1206) remaining source data, wherein the designation of the remaining number of alignment markers is changed (e.g., change sync bits to reclassify alignment marker as a data group or different type of control bits) and the remaining alignment marker blocks are transcoded with remaining source data; passing (1208) the output to a gearbox 1016 and generating a plurality of code symbols, and encoding (1210) by an encoder (e.g., FEC encoder) a data stream comprising the plurality of code symbols to output a data stream comprising the plurality of code symbols.

Any process descriptions or blocks in flow diagrams should be understood as representing modules, segments, or portions of code which include one or more executable instructions for implementing specific logical functions or steps in the process, and alternate implementations are included within the scope of embodiments of the present disclosure in which functions may be executed out of order from that shown or discussed, including substantially concurrently or in reverse order, depending on the functionality involved, as would be understood by those reasonably skilled in the art of the present disclosure. In addition, the scope of the certain embodiments of the present disclosure includes embodying the functionality of the disclosed herein in logic embodied in hardware or software-configured mediums.

Embodiments of the present disclosure can be implemented in hardware, software, firmware, or a combination thereof. Some embodiments are implemented in software or firmware that is stored in a memory and that is executed by a suitable instruction execution system. If implemented in hardware, alternative embodiments can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In embodiments where functionality of the coding system or associated components are implemented in software and/or firmware, such software or firmware may be stored in a memory and that is executed by a suitable instruction execution system of the computer system 300 or of another host device.

In addition, the scope of certain embodiments of the present disclosure includes embodying the functionality of embodiments of the present disclosure in logic embodied in hardware or software-configured mediums, including computer-readable mediums. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical).

It should be emphasized that the above-described embodiments of the present disclosure are merely possible examples of implementations, merely set forth for a clear understanding of the principles of the disclosed embodiments of the coding system. Many variations and modifications may be made to the above-described embodiment(s) without departing substantially from the spirit and principles. For instance, though described using certain RS codes, it should be appreciated in the context of the present disclosure that other codes, RS or otherwise, may be employed in some embodiments using the described systems and methods. All such modifications and variations are intended to be included herein within the scope of this disclosure and protected by the following claims.

Having summarized various features of certain embodiments of a coding system of the present disclosure, reference will now be made in detail to the description of the disclosure as illustrated in the drawings. While the disclosure is described in connection with these drawings, there is no intent to limit it to the embodiment or embodiments disclosed herein. For instance, though described in the context of 100G-KR Ethernet systems, other network environments are also contemplated to be within the scope of the disclosure. Further, although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

At least the following is claimed:

1. A method comprising:
   receiving a plurality of transcoded blocks;
   inserting a pair of sync bits within a first transcoded block of the plurality of transcoded blocks such that the pair of sync bits are separated within the first transcoded block, the pair of sync bits including a first sync bit and a second sync bit;
   allocating a first sync bit of another pair of sync bits in a second transcoded block of the plurality of transcoded blocks according to a position specified within a sync array, after the pair of sync bits are allocated in the first transcoded block; and
   transmitting the plurality of transcoded blocks across physical lanes of a transmission medium.

2. The method of claim 1, wherein the second sync bit of the pair of sync bits is allocated at a fixed distance after the first sync bit of the pair of sync bits within a forward error correction block comprising the first transcoded block.

3. The method of claim 2, wherein the sync array specifies positions for allocating a corresponding first sync bit of pairs of sync bits within the plurality of transcoded blocks.

4. The method of claim 3, wherein a second sync bit of the another pair of sync bits is allocated at the fixed distance after the first sync bit of the another pair of sync bits within the second transcoded block.

5. The method of claim 3, further comprising:
   selecting values of the sync array to ensure that that a pair of sync bits allocated to each transcoded block appears on a same physical lane.

6. The method of claim 1, further comprising:
   utilizing a 256B/258B transcoding in which two bits are used to indicate a position of a 64-bit block within a 256-bit block and 1 additional bit is used as a parity bit for the two bits.

7. The method of claim 1, further comprising utilizing a 512B/514B transcoding.

8. A transcoding system, comprising:
   a transcoder including circuitry coupled to a first multiplexer and plural first registers, the circuitry being configured to:
      insert a pair of sync bits within a first transcoded block such that the pair of sync bits are separated within the first transcoded block, the pair of sync bits including a first sync bit and a second sync bit;
      allocate a first sync bit of another pair of sync bits in a second transcoded block according to a position specified within a sync array, after the pair of sync bits are allocated in the first transcoded block; and
      output the first transcoded block and the second transcoded block.

9. The transcoding system of claim 8, wherein the second sync bit of the pair of sync bits is allocated at a fixed distance after the first sync bit of the pair of sync bits within a forward error correction block comprising the first transcoded block.

10. The transcoding system of claim 9, wherein the sync array specifies positions for allocating a corresponding first sync bit of pairs of sync bits within a plurality of transcoded blocks.

11. The transcoding system of claim 9, wherein a second sync bit of the another pair of sync bits is allocated at the fixed distance after the first sync bit of the another pair of sync bits within the second transcoded block.

12. The transcoding system of claim 9, wherein the transcoder is configured to select values of the sync array to ensure that that a pair of sync bits allocated to each transcoded block appears on a same physical lane.

13. The transcoding system of claim 8, wherein the transcoder utilizes a 256B/258B transcoding in which two bits are used to indicate a position of a 64-bit block within a 256-bit block and 1 additional bit is used as a parity bit for the two bits.

14. The transcoding system of claim 8, wherein the transcoder utilizes a 512B/514B transcoding.

15. A transcoding system, comprising:
   circuitry configured to
      insert a pair of sync bits within a first transcoded block such that the pair of sync bits are separated within the first transcoded block and a positioning of the pair of sync bits provides that the pair of sync bits in the first transcoded block will appear on a same physical lane during transmission of subblocks of the first transcoded block in a round robin manner across a plurality of physical lanes of a transmission medium;
      allocate a first sync bit of another pair of sync bits in a second transcoded block according to a position specified within a sync array, after the pair of sync bits are allocated in the first transcoded block; and
      output the first transcoded block and the second transcoded block.

16. The transcoding system of claim 15, wherein the pair of sync bits comprises a first sync bit and a second sync bit.

17. The transcoding system of claim 16, wherein the second sync bit of the pair of sync bits is allocated at a fixed distance after the first sync bit of the pair of sync bits within a forward error correction block comprising the first transcoded block.

18. The transcoding system of claim 15, wherein the sync array specifies positions for allocating a corresponding first sync bit of pairs of sync bits within a plurality of transcoded blocks.

19. The transcoding system of claim 15, wherein a second sync bit of the another pair of sync bits is allocated at the fixed distance after the first sync bit of the another pair of sync bits within the second transcoded block.

20. The transcoding system of claim 15, wherein the circuitry is configured to utilize a 256B/258B transcoding in which two bits are used to indicate a position of a 64-bit block within a 256-bit block and 1 additional bit is used as a parity bit for the two bits.

* * * * *